United States Patent
Rashley et al.

(10) Patent No.: US 11,939,257 B2
(45) Date of Patent: *Mar. 26, 2024

(54) STILLING VESSEL FOR SUBMERGED COMBUSTION MELTER

(71) Applicant: Owens-Brockway Glass Container Inc., Perrysburg, OH (US)

(72) Inventors: Shane T. Rashley, Sylvania, OH (US); David Soley, Swanton, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/898,046

(22) Filed: Aug. 29, 2022

(65) Prior Publication Data
US 2022/0411307 A1 Dec. 29, 2022

Related U.S. Application Data

(63) Continuation of application No. 16/590,068, filed on Oct. 1, 2019, now Pat. No. 11,485,664.

(51) Int. Cl.
| | |
|---|---|
| C03B 5/225 | (2006.01) |
| C03B 5/235 | (2006.01) |
| C03B 7/06 | (2006.01) |
| C03B 9/13 | (2006.01) |
| C03C 3/087 | (2006.01) |

(52) U.S. Cl.
CPC ............ *C03B 5/225* (2013.01); *C03B 5/2353* (2013.01); *C03B 5/2356* (2013.01); *C03B 7/06* (2013.01); *C03B 9/13* (2013.01); *C03C 3/087* (2013.01); *C03B 2211/23* (2013.01)

(58) Field of Classification Search
CPC .............................. C03B 5/225; C03B 5/2356
See application file for complete search history.

(56) References Cited

U.S. PATENT DOCUMENTS

| | | | |
|---|---|---|---|
| 3,580,976 | A | 5/1971 | Clerc de Buss |
| 3,592,623 | A | 7/1971 | Shepherd |
| 3,659,029 | A | 4/1972 | de Bussy |
| 4,539,034 | A | 9/1985 | Hanneken |
| 4,545,800 | A | 10/1985 | Won et al. |
| 4,592,770 | A | 6/1986 | Pearman et al. |

(Continued)

FOREIGN PATENT DOCUMENTS

WO   2013188167 A1   12/2013

OTHER PUBLICATIONS

PCT International Search Report and Written Opinion, International Serial No. PCT/US2020/053394, Filing Date: Sep. 30, 2020, Applicant: Owens-Brockway Gless Container Inc., dated Dec. 7, 2020).

(Continued)

*Primary Examiner* — Lisa L Herring

(57) ABSTRACT

A method of producing glass includes receiving unrefined molten glass in a stilling chamber of a stilling tank at a fluctuating flow rate. An intermediate pool of molten glass is held within the stilling chamber of the stilling tank and is heated therein by one or more non-submerged burners. Molten glass flows from the intermediate pool of molten glass to a transfer pool of molten glass held in a spout chamber of a feeding spout that is appended to the stilling tank. A molten glass feed can be drawn from the transfer pool of molten glass and delivered from the feeding spout at a controlled flow rate.

9 Claims, 5 Drawing Sheets

(56) References Cited

U.S. PATENT DOCUMENTS

| | | |
|---|---|---|
| 4,632,687 A | 12/1986 | Kunkle et al. |
| 4,704,153 A | 11/1987 | Schwenninger |
| 4,713,106 A | 12/1987 | McCague |
| 5,116,399 A | 5/1992 | Lauwers |
| 1,909,152 A | 5/1993 | Peiler |
| 6,237,369 B1 | 5/2001 | LeBlanc et al. |
| 6,715,319 B2 | 4/2004 | Barrow et al. |
| 8,973,405 B2 | 3/2015 | Charbonneau et al. |
| 8,997,525 B2 | 4/2015 | Shock et al. |
| 9,021,838 B2 | 5/2015 | Charbonneau et al. |
| 9,096,452 B2 | 8/2015 | Charbonneau et al. |
| 9,096,453 B2 | 8/2015 | Charbonneau et al. |
| 9,145,319 B2 | 9/2015 | Mobley et al. |
| 9,227,865 B2 | 1/2016 | Shock et al. |
| 9,492,831 B2 | 11/2016 | Charbonneau et al. |
| 9,533,905 B2 | 1/2017 | Charbonneau et al. |
| 9,573,831 B2 | 2/2017 | Charbonneau et al. |
| 9,576,831 B2 | 2/2017 | Hatano et al. |
| 9,650,277 B2 | 5/2017 | Charbonneau et al. |
| 9,676,644 B2 | 6/2017 | Shock et al. |
| 9,776,902 B2 | 10/2017 | Mobley et al. |
| 9,902,639 B2 | 2/2018 | Mobley et al. |
| 2002/0162358 A1 | 11/2002 | Jeanvoine et al. |
| 2005/0236747 A1 | 10/2005 | Rue et al. |
| 2008/0276652 A1 | 11/2008 | Bauer et al. |
| 2009/0235695 A1 | 9/2009 | Pierrot et al. |
| 2011/0308280 A1 | 12/2011 | Huber |
| 2012/0210751 A1 | 8/2012 | Rue et al. |
| 2013/0192308 A1 | 8/2013 | Zimmermann et al. |
| 2014/0020429 A1 | 1/2014 | Gallenberger et al. |
| 2016/0002084 A1 | 1/2016 | Charbonneau et al. |
| 2017/0015579 A1 | 1/2017 | Charbonneau et al. |
| 2017/0096358 A1 | 4/2017 | Martin et al. |
| 2017/0106442 A1 | 4/2017 | Geib |
| 2017/0113958 A1 | 4/2017 | Charbonneau et al. |
| 2017/0158544 A1 | 6/2017 | Shock et al. |
| 2017/0240450 A1 | 8/2017 | Meng et al. |
| 2019/0284076 A1 | 9/2019 | Wang et al. |
| 2019/0284078 A1 | 9/2019 | Wang et al. |
| 2019/0284079 A1 | 9/2019 | Wang et al. |
| 2021/0094858 A1 | 4/2021 | Wang et al. |
| 2021/0094859 A1 | 4/2021 | Wang et al. |
| 2021/0094860 A1 | 4/2021 | Pinc et al. |
| 2021/0094861 A1 | 4/2021 | Wang et al. |

OTHER PUBLICATIONS

Peru Office Action, Application No. 423-2022, Applicant: Owens-Brockway Glass Container Inc., dated Feb. 24, 2023.

Informe De Busqueda (Chilian Search Report), Serial No. 202103094, Title: Stilling Vessel for Submerged Combustion Melter, Applicant: Owens-Brockway Glass Container Inc., dated Jul. 3, 2023.

Informe Pericial (Chilian Expert Report), Serial No. 202103094, Title: Stilling Vessel for Submerged Combustion Melter, Applicant: Owens-Brockway Glass Container Inc., dated Jul. 3, 2023.

Chilean Office Action with English translation, Application No. 202103094, Applicant: Owens-Brockway Glass Container Inc, dated Jul. 3, 2023.

STILLING VESSEL FOR SUBMERGED COMBUSTION MELTER

The present disclosure is directed to glass production using submerged combustion melting and, more specifically, to a stilling vessel for managing the flow of foamy molten glass produced in a submerged combustion melter.

BACKGROUND

Glass is a rigid amorphous solid that has numerous applications. Soda-lime-silica glass, for example, is used extensively to manufacture flat glass articles including windows, hollow glass articles including containers such as bottles and jars, and also tableware and other specialty articles. Soda-lime-silica glass comprises a disordered and spatially crosslinked ternary oxide network of $SiO_2$—$Na_2O$—$CaO$. The silica component ($SiO_2$) is the largest oxide by weight and constitutes the primary network forming material of soda-lime-silica glass. The $Na_2O$ component functions as a fluxing agent that reduces the melting, softening, and glass transition temperatures of the glass, as compared to pure silica glass, and the CaO component functions as a stabilizer that improves certain physical and chemical properties of the glass including its hardness and chemical resistance. The inclusion of $Na_2O$ and CaO in the chemistry of soda-lime-silica glass renders the commercial manufacture of glass articles more practical and less energy intensive than pure silica glass while still yielding acceptable glass properties. Soda-lime-silica glass, in general and based on the total weight of the glass, has a glass chemical composition that includes 60 wt % to 80 wt % $SiO_2$, 8 wt % to 18 wt % $Na_2O$, and 5 wt % to 15 wt % CaO.

In addition to $SiO_2$, $Na_2O$, and CaO, the glass chemical composition of soda-lime-silica glass may include other oxide and non-oxide materials that act as network formers, network modifiers, colorants, decolorants, redox agents, or other agents that affect the properties of the final glass. Some examples of these additional materials include aluminum oxide ($Al_2O_3$), magnesium oxide (MgO), potassium oxide ($K_2O$), carbon, sulfates, nitrates, fluorines, chlorines, and/or elemental or oxide forms of one or more of iron, arsenic, antimony, selenium, chromium, barium, manganese, cobalt, nickel, sulfur, vanadium, titanium, lead, copper, niobium, molybdenum, lithium, silver, strontium, cadmium, indium, tin, gold, cerium, praseodymium, neodymium, europium, gadolinium, erbium, and uranium. Aluminum oxide is one of the more commonly included materials—typically present in an amount up to 2 wt % based on the total weight of the glass—because of its ability to improve the chemical durability of the glass and to reduce the likelihood of devitrification. Regardless of what other oxide and/or non-oxide materials are present in the soda-lime-glass besides $SiO_2$, $Na_2O$, and CaO, the sum total of those additional materials is preferably 10 wt % or less, or more narrowly 5 wt % or less, based on the total weight of the soda-lime-silica glass.

Submerged combustion (SC) melting is a melting technology that can produce glass, including soda-lime-silica glass, and has recently gained interest as a potentially viable option for commercial glass manufacturing. Contrary to conventional melting practices, in which a molten glass bath is heated primarily with radiant heat from overhead non-submerged burners, SC melting involves injecting a combustible gas mixture that contains fuel and oxygen directly into a glass melt contained in a SC melter, typically though submerged burners mounted in the floor or in an immersed portion of the sidewalls of the melter. The combustible gas mixture autoignites and the resultant combustion products cause vigorous stirring and turbulence as they are discharged through the glass melt. The intense shearing forces experienced between the combustion products and the glass melt cause rapid heat transfer and particle dissolution throughout the molten glass compared to the slower kinetics of a conventional melting furnace.

While SC technology can melt and integrate a vitrifiable feed material into the glass melt relatively quickly, thus resulting in relatively low glass residence times compared to conventional glass melting practices, the glass melt tends to be foamy and have a relatively low density despite being chemically homogenized when discharged from the SC melter. Moreover, due to the turbulent nature of the glass melt contained in the SC melter, the flow of molten glass discharged from the SC melter tends to fluctuate. A fluctuating flow of discharged molten glass can make it difficult to operate downstream equipment, such as a glass finer, since an unpredictable input flow of molten glass can cause certain operating conditions of the downstream component to have to be frequently adjusted. A fluctuating flow of discharged molten glass is also difficult to regulate over time to match glass production requirements. To help implement the use of SC melting in a commercial glass manufacturing setting, the fluctuations in the flow of molten glass discharged from the SC melter need to be managed in one way or another.

SUMMARY OF THE DISCLOSURE

The present disclosure relates to a stilling vessel that is connected to a submerged combustion melter. Fluid communication is established between the submerged combustion melter and the stilling vessel by a throat. The stilling vessel includes a stilling tank and a feeding spout. The stilling tank defines a stilling chamber that receives unrefined foamy molten glass from the submerged combustion melter through the interconnecting throat. The unrefined foamy molten glass received from the submerged combustion melter is held within the stilling chamber as an intermediate pool of molten glass. The stilling tank may include non-submerged burners to heat the intermediate pool of molten glass so that the temperature of the glass does not decrease and cause an unwanted increase in glass viscosity. Some of the non-submerged burners may even impinge the intermediate pool of molten glass with their combustion products to reduce an amount of foam that ascends to the top surface of the pool of molten glass. The feeding spout is appended to the stilling tank and defines a spout chamber that communicates with the stilling chamber. The feeding spout holds a transfer pool of molten glass and is configured to deliver a molten glass feed from the transfer pool at a controlled rate to a downstream component such as glass finer.

The present disclosure embodies a number of aspects that can be implemented separately from or in combination with each other to provide a method for producing glass. According to one embodiment of the present disclosure, a method of producing glass includes several steps. One step involves discharging combustion products from one or more submerged burners directly into a glass melt contained within an interior reaction chamber of a submerged combustion melter. The combustion products discharged from the one or more submerged burners agitate the glass melt. Another step of the method involves drawing unrefined foamy molten glass from the glass melt and discharging the unrefined foamy molten glass out of the submerged combustion melter through a molten glass outlet. Still another step of the method involves introducing the unrefined foamy molten glass into a stilling chamber of a stilling tank that is in fluid communication with the submerged combustion melter. The unrefined foamy molten glass merges with an intermediate pool of molten glass being held within the stilling chamber of the stilling tank. Yet another step of the method involves heating the intermediate pool of molten glass with combustion products discharged from one or more non-submerged burners mounted in a housing of the stilling tank that defines the stilling chamber. Another step of the method involves flowing molten glass from the intermediate pool of molten glass into a transfer pool of molten glass being held in a spout chamber of a feeding spout. And still another step of the method involves delivering a molten glass feed out of the feeding spout from the transfer pool of molten glass at a controlled rate.

According to another aspect of the present disclosure, a method of producing glass includes several steps. One step of the method involves introducing unrefined foamy molten glass discharged from a submerged combustion melter into a stilling chamber of a stilling tank through a throat that provides a flow path from a molten glass outlet of the submerged combustion melter to an inlet of the stilling tank. The unrefined foamy molten glass has a soda-lime-silica glass chemical composition and merges with an intermediate pool of molten glass held within the stilling chamber of the stilling tank. Another step of the method involves heating the intermediate pool of molten glass with combustion products discharged from one or more non-submerged burners mounted in a housing of the stilling tank that defines the stilling chamber. Still another step of the method involves flowing molten glass from the intermediate pool of molten glass to a transfer pool of molten glass held in a spout chamber of a feeding spout appended to the stilling tank. The feeding spout has a spout bowl that partially defines the spout chamber and an orifice plate affixed to the spout bowl through which a molten glass feed is delivered from the feeding spout. And yet another step of the method involves introducing the molten glass feed into a molten glass bath held within glass finer. The molten glass bath flows towards an outlet opening of the glass finer and produces refined molten glass that emerges from the outlet opening of the glass finer. The refined molten glass has a density that is greater than a density of the unrefined foamy molten glass discharged from the submerged combustion melter.

According to yet another aspect of the present disclosure, a system for producing glass includes a submerged combustion melter, a stilling vessel, and a throat. The submerged combustion melter has a housing that defines an interior reaction chamber, a feed material inlet for introducing a vitrifiable feed material into the interior reaction chamber, and a molten glass outlet for discharging unrefined molten glass from the interior reaction chamber. The submerged combustion melter further comprises one or more submerged burners. The stilling vessel includes a stilling tank and a feeding spout. The stilling tank has a housing that defines a stilling chamber, an inlet, and an outlet, and the feeding spout is appended to the stilling tank so as to cover the outlet of the stilling tank. The feeding spout has a spout bowl and an orifice plate defining at least one orifice for delivering a molten glass feed out of the feeding spout. The throat interconnects the submerged combustion melter and the stilling vessel and establishes fluid communication between the interior reaction chamber and the stilling chamber by providing a flow path from the molten glass outlet of the submerged combustion melter to the inlet of the stilling tank.

BRIEF DESCRIPTION OF THE DRAWINGS

The disclosure, together with additional objects, features, advantages, and aspects thereof, will be best understood from the following description, the appended claims, and the accompanying drawings, in which:

DETAILED DESCRIPTION

Figure 1:
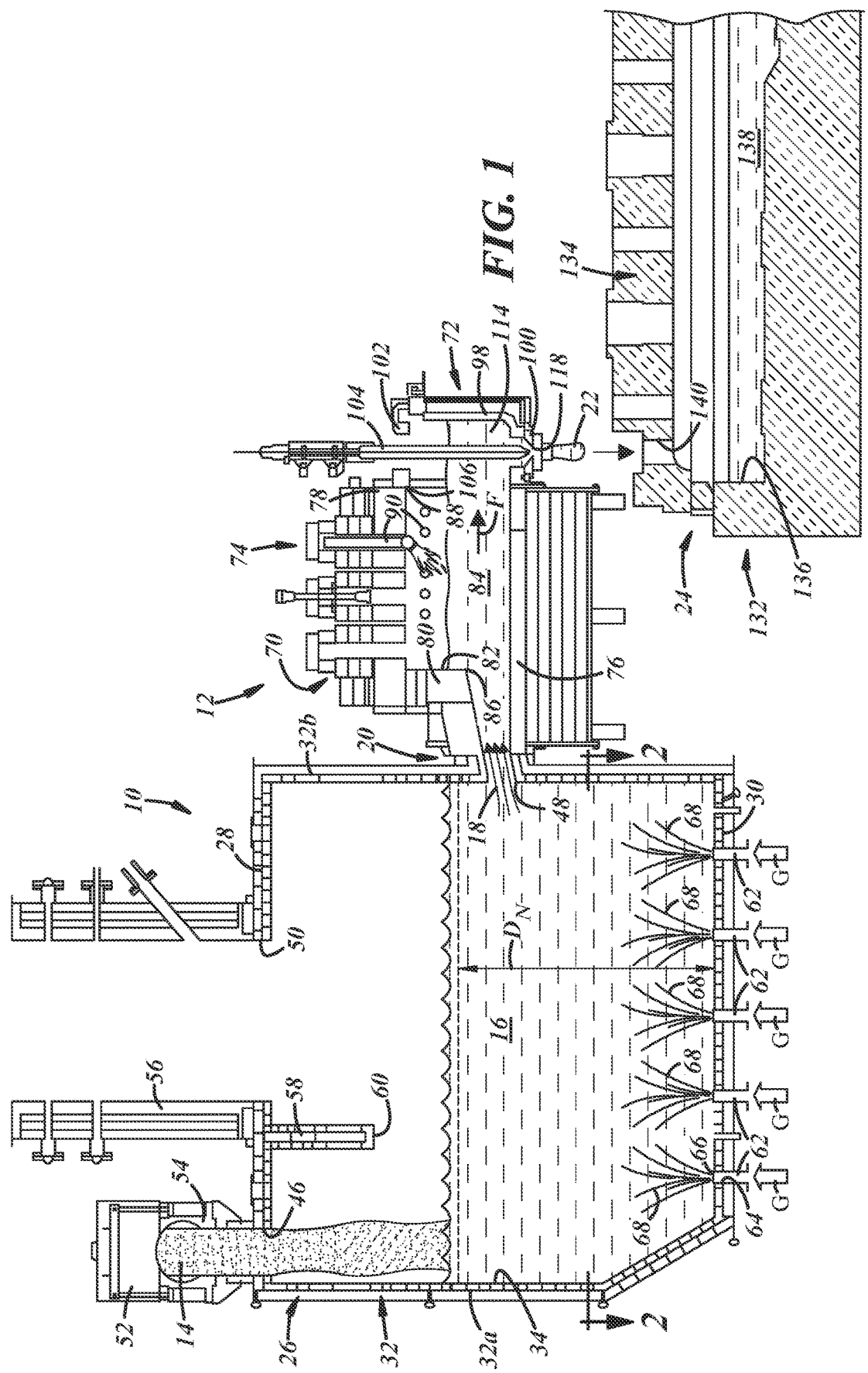
FIG. 1 is an elevated cross-sectional representation of a system that includes a submerged combustion melter and a stilling vessel attached to the submerged combustion melter according to one embodiment of the present disclosure.
Figure 2:
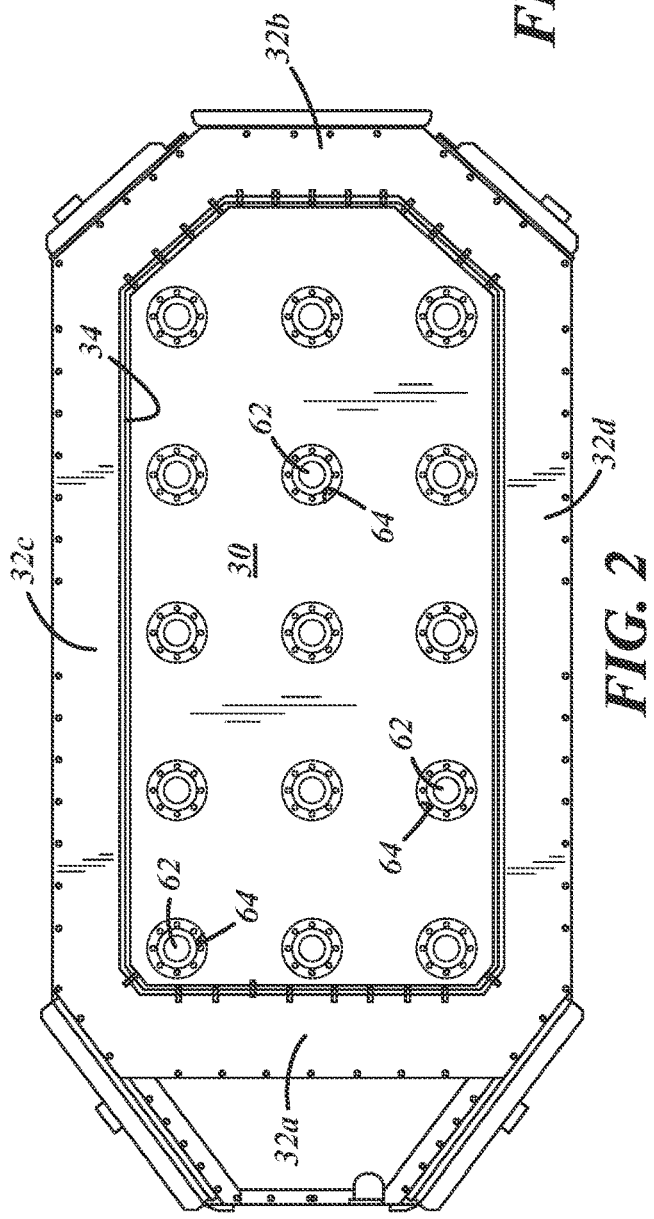
FIG. 2 is a cross-sectional plan view of the floor of the submerged combustion melter illustrated in FIG. 1 and taken along section line 2-2.
Figure 4:
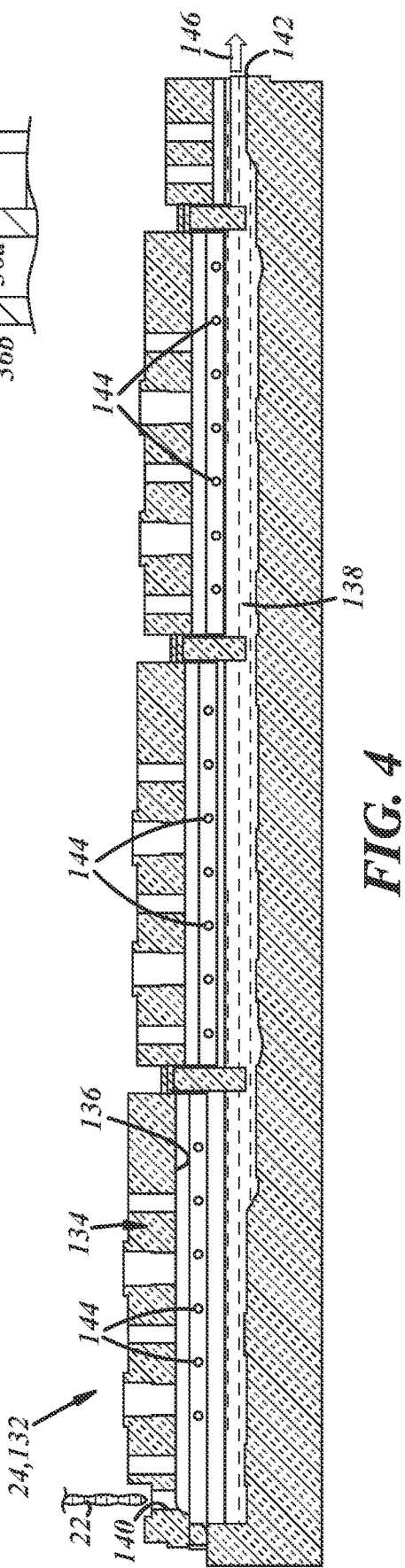
FIG. 4 is a cross-sectional illustration of a glass finer that receives a molten glass feed from the stilling vessel attached to the submerged combustion melter, as depicted in FIG. 1, according to one embodiment of the present disclosure.

A system for producing glass that includes a submerged combustion (SC) melter 10 and a stilling vessel 12 connected to the SC melter 10 is shown in FIGS. 1-2 according to various practices of the present disclosure. The SC melter 10 is fed with a vitrifiable feed material 14 that exhibits a glass-forming formulation. The vitrifiable feed material 14 is melt-reacted inside the SC melter 10 within an agitated glass melt 16 to produce molten glass. Unrefined foamy molten glass 18 is drawn from the glass melt 16 and discharged from the SC melter through a throat 20 that interconnects the SC melter 10 and the stilling vessel 12 and establishes fluid communication between the two structures 10, 12. The stilling vessel 12 receives the unrefined foamy molten glass 18 discharged from the SC melter 10 and controllably delivers a molten glass feed 22 to a downstream component 24. The downstream component 24 may, as shown, be a glass finer that fines and optionally thermally conditions the molten glass feed 22 for subsequent glass forming operations.

Figure 3:
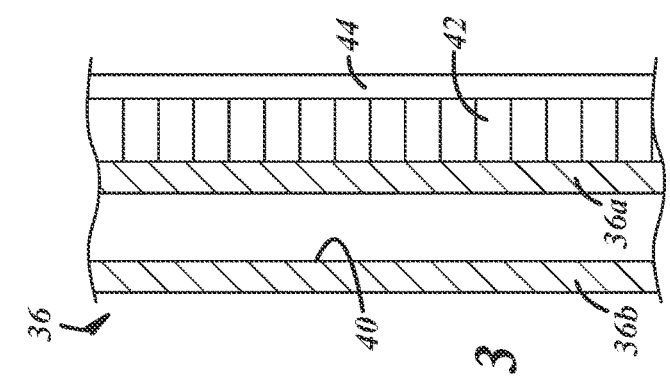
FIG. 3 is a cross-sectional illustration of a liquid cooled panel that may be used to construct some or all of the housing of the submerged combustion melter according to one embodiment of the present disclosure.

The SC melter 10 includes a housing 26 that has a roof 28, a floor 30, and a surrounding upstanding wall 32 that connects the roof 28 and the floor 30. The surrounding upstanding wall 32 further includes a front end wall 32a, a rear end wall 32b that opposes and is spaced apart from the front end wall 32a, and two opposed lateral sidewalls 32c, 32d that connect the front end wall 32a and the rear end wall 32b. Together, the roof 28, the floor 30, and the surrounding upstanding wall 32 define an interior reaction chamber 34 of the SC melter 10 that holds the glass melt 16 when the melter 10 is operational. At least the floor 30 and the upstanding side wall 32 of the housing 26, as well as the roof 28 if desired, may be constructed from one or more fluid cooled panels 36 as shown, for example, in FIG. 3. Each of the fluid cooled panels 36 may include an inner wall 36a and an outer wall 36b that together define an internal cooling space 40 through which a coolant, such as water, may be circulated. One or more baffles (not shown) may extend fully or partially between the confronting interior surfaces of the inner and outer walls 36a, 36b to direct the flow of the coolant along a desired flowpath. As a result of being liquid cooled, a glass-side refractory material layer 42 covering the inner wall 36a of each liquid cooled panel 36 supports, and is covered by, a layer of frozen glass 44 that forms in-situ between an outer skin of the glass melt 16 and a surface of the glass-side refractory material layer 42. This layer of frozen glass 44, once formed, shields and effectively protects the underlying inner wall 36a from the glass melt 16. The glass-side refractory material layer 42 may be composed of AZS (i.e., alumina-zirconia-silica).

The housing 26 of the SC melter 10 defines a feed material inlet 46, a molten glass outlet 48, and an exhaust vent 50. As shown here in FIG. 1, the feed material inlet 46 may be defined in the roof 28 of the housing 26 adjacent to or a distance from the front end wall 32a, and the molten glass outlet 48 may be defined in the rear end wall 32b of the housing 26 adjacent to or a distance above the floor 30, although other locations for the feed material inlet 46 and the molten glass outlet 48 are certainly possible. The feed material inlet 46 provides an entrance to the interior reaction chamber 34 for the delivery of the vitrifiable feed material 14. A batch feeder 52 that is configured to introduce a metered amount of the vitrifiable feed material 14 into the interior reaction chamber 34 may be coupled to the housing 26. The batch feeder 52 may, for example, include a rotating screw (not shown) that rotates within a feed tube 54 of a slightly larger diameter that communicates with the feed material inlet 46 to deliver the vitrifiable feed material 14 from a feed hopper into the interior reaction chamber 34 at a controlled rate. The molten glass outlet 48 outlet provides an exit from the interior reaction chamber 34 for the discharge of the unrefined foamy molten glass 18 out of the SC melter 10.

The exhaust vent 50 is preferably defined in the roof 28 of the housing 26 between the front end wall 32a and the rear end wall 32b at a location downstream from the feed material inlet 46. An exhaust duct 56 communicates with the exhaust vent 50 and is configured to remove gaseous compounds from the interior reaction chamber 34. The gaseous compounds removed through the exhaust duct 56 may be treated, recycled, or otherwise managed away from the SC melter 10 as needed. To help prevent or at least minimize the potential loss of some of the vitrifiable feed material 14 through the exhaust vent 50 as unintentional feed material castoff, a partition wall 58 that depends from the roof 28 of the housing 26 may be positioned between the feed material inlet 46 and the exhaust vent 50. The partition wall 58 may include a lower free end 60 that is positioned close to, but above, the glass melt 16, as illustrated, or it may be submerged within the glass melt 16. Preferably, the partition wall 58 is constructed from a fluid-cooled panel similar to that depicted in FIG. 3.

The SC melter 10 includes one or more submerged burners 62. Each of the one or more submerged burners 62 is mounted in a port 64 defined in the floor 30 (as shown) and/or the surrounding upstanding wall 32 at a portion of the wall 32 that is immersed by the glass melt 16. Each of the submerged burner(s) 62 forcibly injects a combustible gas mixture G into the glass melt 16 through an output nozzle 66. The combustible gas mixture G comprises fuel and an oxidant. The fuel supplied to the submerged burner(s) 62 is preferably methane or propane, and the oxidant may be pure oxygen or include a high percentage (>80 vol %) of oxygen, in which case the burner(s) 62 are oxy-fuel burners, or it may be air or any oxygen-enriched gas. Upon being injected into the glass melt 16, the combustible gas mixture G immediately autoignites to produce combustion products 68—namely, $CO_2$, CO, $H_2O$, and any uncombusted fuel, oxygen, and/or other gas compounds such as nitrogen—that are discharged into and through the glass melt 16. Anywhere from five to thirty submerged burners 62 are typically installed in the SC melter 10 although more or less burners 62 may certainly be employed depending on the size and melt capacity of the melter 10.

The stilling vessel 12 is connected to the SC melter 10 with both structures 10, 12 preferably being mechanically attached and supported on a common frame so that the two structures 10, 12 rock and vibrate in unison in response to sloshing and generally turbulent nature of the glass melt 16. The stilling vessel 12 receives the unrefined foamy molten glass 18 discharged from the SC melter 10, which has a tendency to have a fluctuating flow rate, and delivers the molten glass feed 22 at a controlled flow rate to the downstream component 24. In this way, the SC melter 10 can be operated to produce molten glass, and the downstream processing of the molten glass—most notably glass fining and thermal conditioning—can be practiced more efficiently and with better overall control since the molten glass input flow to the component(s) performing those operations can be regulated with good precision. The stilling vessel 12 can additionally be operated to partially fine and/or reduce the foam content of the intermediate pool of molten glass that pools within the stilling vessel 12 while also preventing heat loss from the glass before delivering the molten glass feed 22 to the downstream component 24. The stilling vessel 12 depicted here includes a stilling tank 70 and a feeding spout 72 appended to the stilling tank 70.

As shown in FIGS. 5-8, the stilling tank 70 includes a housing 74 that includes a floor 76, a roof 78, and an upstanding wall 80 that connects the floor 76 and the roof 78. Here, the upstanding wall 80 includes a front end wall 80a, a rear end wall 80b that opposes and is spaced apart from the front end wall 80a, and two opposed lateral sidewalls 80c, 80d that connect the front end wall 80a and the rear end wall 80b. In some implementations, and depending on the size of the feeding spout 72, the upstanding wall 80 may not include a rear end wall. Together, the floor 76, the roof 78, and the upstanding wall 80 of the housing 74 of the stilling tank 70 define a stilling chamber 82 that is smaller in volume than the interior reaction chamber 34 of the SC melter 10. The stilling chamber 82 holds an intermediate pool of molten glass 84 that flows in a flow direction F when the SC melter 10 and the stilling vessel 12 are operational. The housing 74 of the stilling tank 70 defines an inlet 86 and an outlet 88 to permit glass flow into and out of the intermediate pool of molten glass 84, respectively, along the flow direction F. The inlet 86 may be defined in the front end wall 80a of the housing 74 and the outlet 88 may be defined in the rear end wall 80b, although other locations are certainly possible.

The intermediate pool of molten glass 84 is fed by the unrefined foamy molten glass 18 being discharged from the SC melter 10 by way of the throat 20. In that regard, the intermediate pool of molten glass 84 is a pooled collection of the discharged unrefined foamy molten glass 18 that moderates the unpredictable and often fluctuating flow rate of the discharged unrefined foamy molten glass 18. The intermediate pool of molten glass 84 is less turbulent than the agitated melt 16 contained in the SC melter 10. This is because the housing 74 of the stilling tank 70 does not include any submerged burners and, thus, the intermediate pool of molten glass 84 is not agitated by the direct firing of combustion products into and through the pool of molten glass 84 from a submerged burner location. By instilling calmness in the intermediate pool of molten glass 84, compared to the turbulence of the glass melt 16 held in the SC melter 10, the homogeneous distribution of entrained gas bubbles that is contained in the unrefined foamy molten glass 18 can begin to settle and ascend up through the pool of molten glass 84, thus commencing the initial phases of fining the molten glass.

While accumulating and holding the calmer intermediate pool of molten glass 84 in the stilling tank 70, the net heat loss from the pool of molten glass 84 is preferably curtailed as much as possible to prevent an increase in the viscosity of the molten glass. To that end, and unlike the housing 26 of the SC melter 10, the housing 74 of the stilling tank 70 is not liquid cooled. The housing 74 of the stilling tank 70 is constructed from a refractory material. For example, the floor 76 and glass-contacting portions of the upstanding wall 80 may be formed from fused cast AZS, bond AZS, castable AZS, high alumina, alumina-chrome, or alumina-silica type refractories. Insulating fire bricks and ceramic fire boards may be disposed behind these portions of the housing 74. The superstructure (i.e., the non-glass contacting portion of the upstanding wall 80) and the roof 78 of the housing 74 may be formed from an alumina-silica refractory such as Mullite. The superstructure may also be insulated with ceramic fiber board. Additionally, the housing 74 of the stilling tank 70 may support one or more non-submerged burners 90. Each of the burner(s) 90 combusts a mixture of fuel and oxidant and is aimed into the stilling chamber 82 so that the combustion products 92 emitted from the burner 90 transfers heat to the intermediate pool of molten glass 84.

The non-submerged burner(s) 90 may include a plurality of sidewall burners 90a mounted in the upstanding wall 80 and, in particular, the superstructure of the upstanding wall 80. For example, the sidewall burners 90a may include a first series of burners 90a1 mounted in one of the lateral sidewalls 80c and a second series of burners 90a2 mounted in the other sidewall 80d. The two series of burners 90a1, 90a2 direct their combustion products 92a1, 92a2 (FIG. 8 only) towards each other, but are not necessarily mounted in diametric alignment, so that heat can be evenly distributed to the intermediate pool of molten glass 84. Each of the burners 90a1, 90a2 may be pivotably mounted or fixedly mounted within a burner block so that the combustion products 92a1, 92a2 emitted from each burner 90a1, 90a2 are aimed into the atmosphere of the stilling chamber 82 above the intermediate pool of molten glass 84, and thus do not directly impinge the pool of molten glass 84, or are aimed to directly impinge the intermediate pool of molten glass 84. Aiming the combustion products 92a1, 92a2 into the atmosphere above the intermediate pool of molten glass 84 transfers heat radiantly to the pool of molten glass 84 while direct impingement between the combustion products 92a1, 92a2 and the intermediate pool of molten glass 84 transfers heat by various mechanisms including conduction and convection. Direct impingement between the combustion products 92a1, 92a2 and the intermediate pool of molten glass 84 can also reduce the volume of foam that may accumulate, whether in a foam layer or not, on the top surface 84' of the intermediate pool of molten glass 84, which can help improve heat transfer efficiency into the pool of molten glass 84 since foam tends to act as an insulating heat barrier. The sidewall burners 90a may be pencil burners or some other suitable burner construction.

In addition to the sidewall burners 90a, at least one roof burner 90b may be mounted in the roof 78 of the housing 74. The roof burner(s) 90b may be pivotably or fixedly mounted within a burner block and be a high-velocity burner whose combustion products 92b are aimed to directly impinge the intermediate pool of molten glass 84. Such a high-velocity burner has a minimum gas velocity of 3000 feet per second (fps) at an exit of the burner. By impinging the intermediate pool of molten glass 84 with the combustion products 92b of the roof burner 90b, particularly at high velocity, any amount of foam that may be present on the top surface 84' of the intermediate pool of molten glass 84 can be reduced. The roof burner 90b may even be angled away from a centerline C of a pivot location of the burner 90b toward the front end wall 80a in order to urge surface foam towards the front end wall 80a opposite to the flow direction F of glass through the intermediate pool of molten glass 84. To maximize the heating and foam pushback effect of the roof burner(s) 90b, and as shown best in FIG. 7, a plurality of roof burners 90b may be spaced across the roof 78 (and preferably angled as described above) between the opposed side walls 80c, 80d to create a curtain 94 of flames that impinges the intermediate pool of molten glass 84 and extends between the sidewalls 80c, 80d transverse to the flow direction F of glass within the stilling tank 70.

Figure 5:
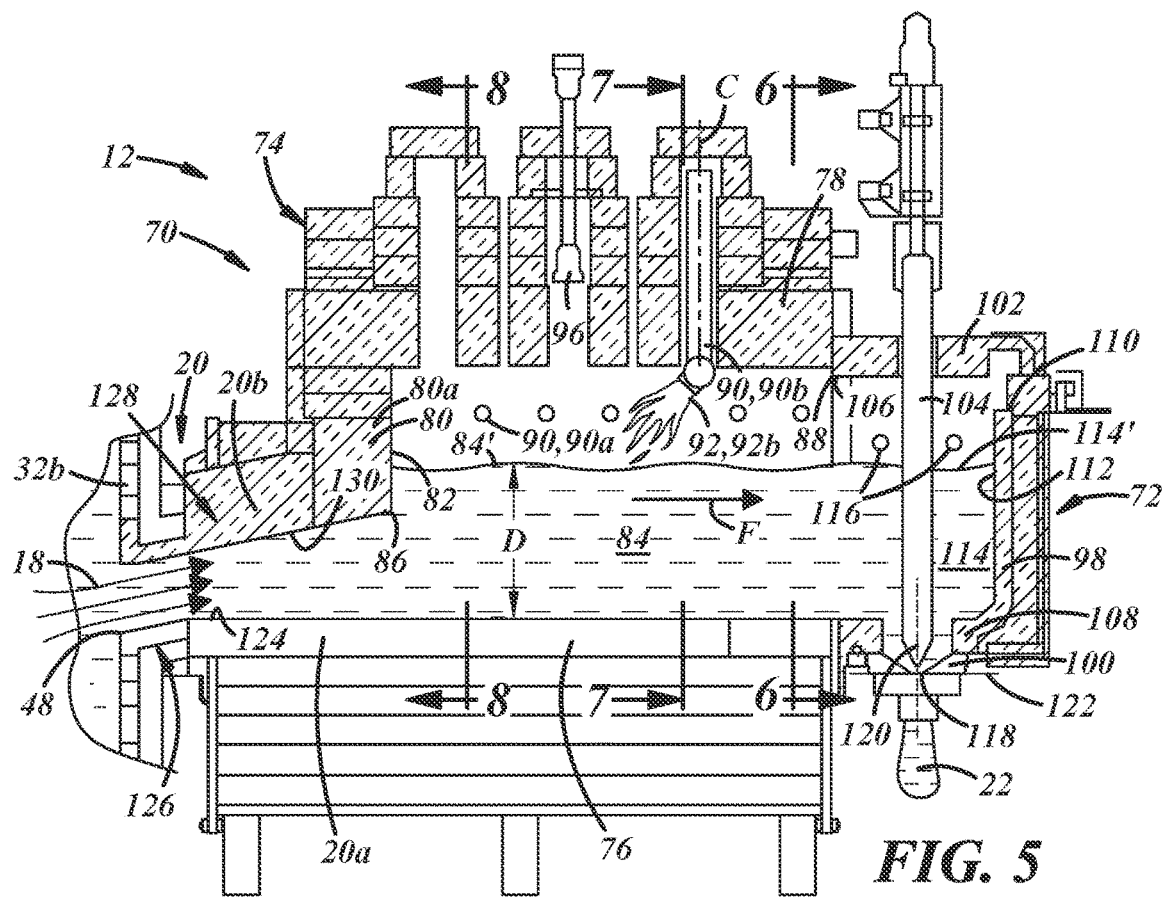
FIG. 5 is an elevated cross-sectional illustration of the stilling vessel shown in FIG. 1 according to one embodiment of the present disclosure.
Figure 7:
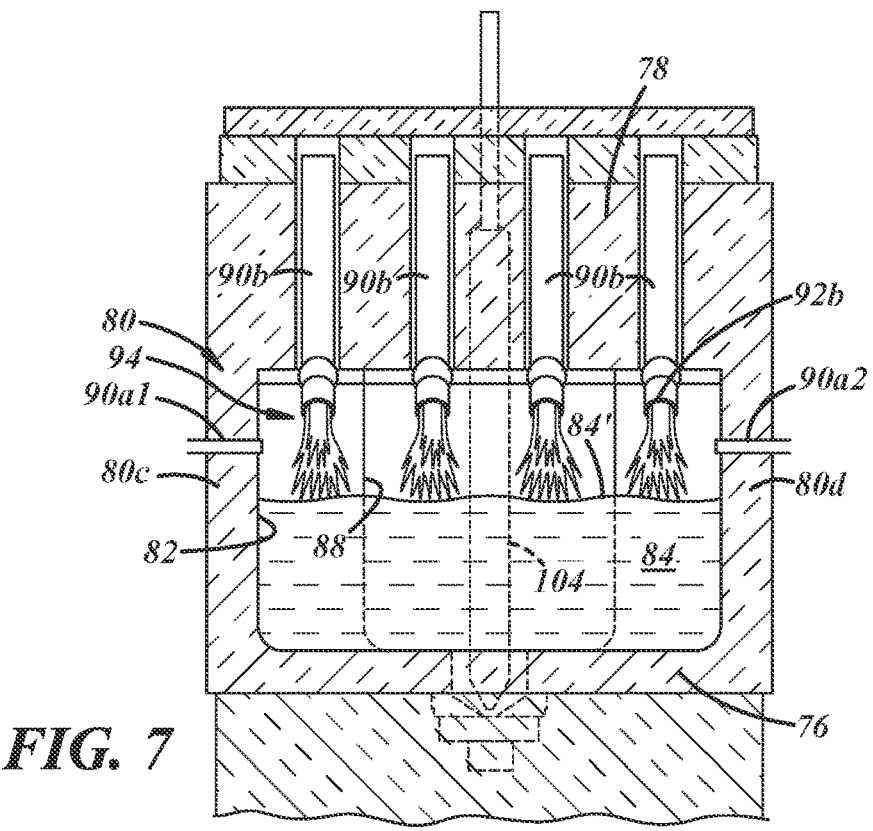
FIG. 7 is a cross-sectional view of the stilling vessel shown in FIG. 5 taken along section line 7-7 in FIG. 5.
Figure 6:
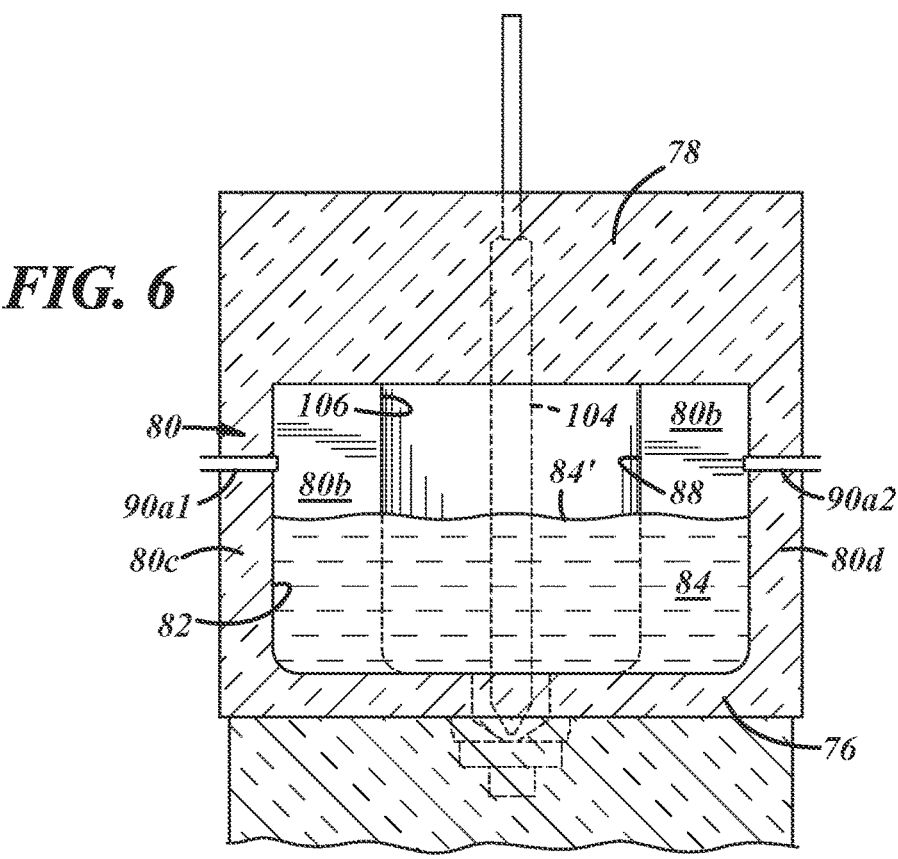
FIG. 6 is a cross-sectional view of the stilling vessel shown in FIG. 5 taken along section line 6-6 in FIG. 5.
Figure 8:
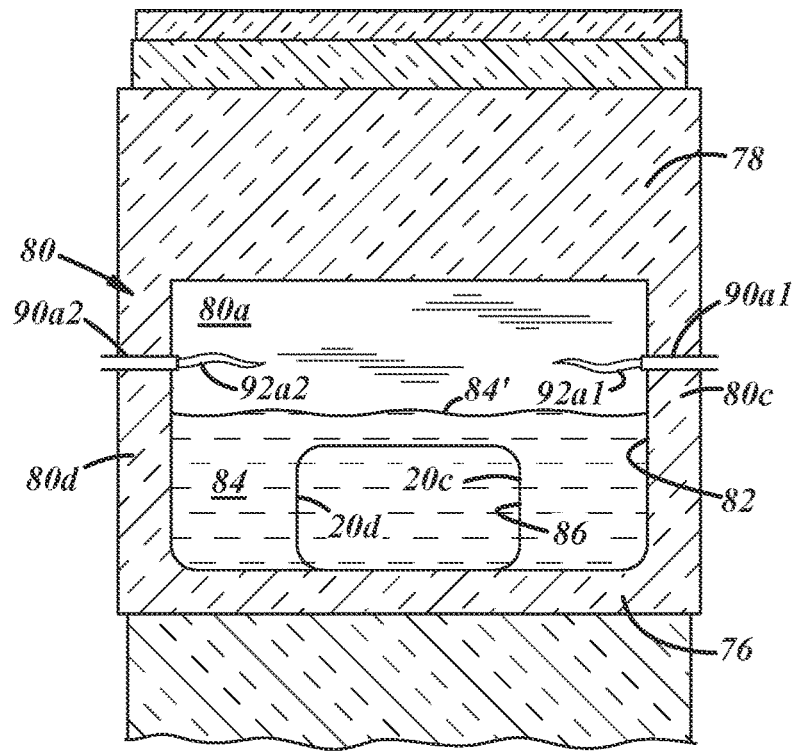
FIG. 8 is a cross-sectional view of the stilling vessel shown in FIG. 5 taken along section line 8-8 in FIG. 5.

The stilling tank 70 may include a level gauge 96 to measure a depth D of the intermediate pool of molten glass 84 within the stilling chamber 82, as shown in FIG. 5. The level gauge 96 may be any level measuring instrument suitable for use with molten glass including, for example, a radar gauge, a dipping probe, or a camera. The level gauge 96 may be supported by the roof 78, as shown, or it may be supported elsewhere in the housing 74. The ability to accurately measure the depth D or level of the intermediate pool of molten glass 84 can assist with the overall control of the SC melter 10 and the stilling vessel 12. Moreover, the depth D of the intermediate molten glass pool 84 can be used to measure, indirectly, the nominal depth $D_N$ of the glass melt 16 contained within the interior reaction chamber 34 of the SC melter 10 since the interior reaction chamber 34 and the stilling chamber 82 are maintained at the same pressure. Accordingly, as a result of equalized static pressure acting on the glass melt 16 and the intermediate pool of molten glass 84, the levels of the two incompressible molten glass bodies tend to be horizontally aligned relative to gravity. And since the intermediate pool of molten glass 84 is relatively calm, its depth D gives a good indication of the nominal depth $D_N$—which is the depth the melt would have if not agitated and allowed to settle—of the glass melt 16 in the SC melter 10.

The feeding spout 72 is appended to the stilling tank 70 and covers the outlet 88 of the housing 74 of the stilling tank 70. The feeding spout 72 includes a spout bowl 98, an orifice plate 100, one or more cover blocks 102, and a reciprocal plunger 104. The spout bowl 98 defines an inlet 106 that fluidly communicates with the outlet 88 of the housing 74 of the stilling tank 70 and has a lower end 108, to which the orifice plate 100 is affixed, and an upper end 110, which supports the one or more cover blocks 102. The spout bowl 98 may be formed from a refractory material including any of the ones mentioned above in connection with the floor 76 and glass-contacting portions of the upstanding wall 80 of the housing 74 of the stilling tank 70. Together, the spout bowl 98, the orifice plate 100, and the cover block(s) 102 define a spout chamber 112 that holds a transfer pool of molten glass 114. One or more non-submerged burners 116, such as one or more pencil burners, may be mounted in the spout bowl 98. Each of the burners 116, as before, combusts a mixture of fuel and oxidant, with each of the burners 116 being aimed into the spout chamber 112 to transfer heat to the transfer pool of molten glass 114 either by radiation or through direct impingement with a top surface 114' of the transfer pool of molten glass 114.

The orifice plate 100 of the feeding spout 72 defines at least one orifice 118—and typically anywhere from one to four, although more than four are certainly possible—through which the molten glass feed 22 can be delivered from the transfer pool of molten glass 114 at a controlled rate that meets the specific input needs of the downstream component 24. The orifice plate 100 may be constructed from a refractory material as well. To control the flow rate of the molten glass feed 22 from the feeding spout 72, the reciprocal movement of the reciprocal plunger 104, which in some embodiments may be a solid rod with or without a tapered head or hollow cylindrical tube, is controlled along an axial centerline 120 oriented transverse to an exit plane 122 of the orifice 118 to regulate the flow rate (either by mass or volume) through the orifice 118. For instance, maximum flow is permitted through the orifice 118 when the reciprocal plunger 104 is fully retracted away from the orifice 118, no flow is permitted when the reciprocal plunger 104 is fully protracted towards the orifice 118 to block the orifice 118, and varying degrees of flow in between maximum flow and no flow are permitted at various locations of the plunger 104 between its fully retracted position and its fully protracted position. If the orifice plate 100 includes more than one orifice 118, a separate retractable plunger 104 is associated with each of the orifices 118.

The throat 20 that interconnects the SC melter 10 and the stilling vessel 12 and establishes fluid communication between the interior reaction chamber 34 and the stilling chamber 82 is a conduit that defines a flow path 124 from the molten glass outlet 48 of the SC melter 10 to the inlet 86 of the stilling tank 70 of the stilling vessel 12, as shown in FIG. 5. The throat 20 includes a bottom wall 20a, a top wall 20b, and a pair of laterally spaced sidewalls 20c, 20d (FIG. 8) that connect the bottom wall 20a and the top wall 20b to define the flow path 124. In one implementation, as shown here, a first portion 126 of the throat 20 extending from the housing 26 and, more specifically, the rear end wall 32b of the housing 26, of the SC melter 10 may be formed as part of a fluid cooled panel of the housing 26, while a second portion 128 of the throat 20 extending from the housing 74 and, more specifically, the front end wall 80a of the housing 74, of the stilling tank 70 may be formed of a refractory material that is not fluid cooled. Additionally, to help extend the life of the throat 20, the top wall 20b may have an upwardly angled surface 130 to deflect escaping gases that may escape from the unrefined foamy molten glass 18 flowing through the throat 20. Each of the other walls 20a, 20c, 20d may be configured in any of a variety of ways to shape the flow path 124 of the throat 20 as desired (e.g., converging toward the stilling chamber 82, diverging toward the stilling chamber 82, constant cross-sectional area, etc.).

During operation of the SC melter 10 and its associated stilling vessel 12, and referring now specifically to FIG. 1, each of the one or more submerged burners 62 individually discharges combustion products 68 directly into and through the glass melt 16 contained in the SC melter 10. The glass melt 16 is a volume of molten glass that often weighs between 1 US ton (1 US ton=2,000 lbs) and 20 US tons, although the weight can be higher, and is generally maintained at a constant volume during steady-state operation of the SC melter 10. As the combustion products 68 are thrust into and through the glass melt 16, which create complex flow patterns and severe turbulence, the glass melt 16 is vigorously agitated and experiences rapid heat transfer and intense shearing forces. The combustion products 68 eventually escape the glass melt 16 and are removed from the interior reaction chamber 34 through the exhaust vent 50 along with any other gaseous compounds that may volatize out of the glass melt 16. Additionally, in some circumstances, one or more non-submerged burners (not shown) may be mounted in the roof 28 and/or the surrounding upstanding wall 32 at a location above the glass melt 16 to provide heat to the glass melt 16, either directly by flame impingement or indirectly through radiant heat transfer, and to also facilitate foam suppression and/or destruction.

While the one or more submerged burners 62 are being fired into the glass melt 16, the vitrifiable feed material 14 is controllably introduced into the interior reaction chamber 34 through the feed material inlet 46. The vitrifiable feed material 14 does not form a batch blanket that rests on top of the glass melt 16 as is customary in a conventional continuous melting furnace, but, rather, is rapidly disbanded and consumed by the agitated glass melt 16. The dispersed vitrifiable feed material 14 is subjected to intense heat transfer and rapid particle dissolution throughout the glass melt 16 due to the vigorous melt agitation and shearing forces caused by the submerged burner(s) 62. This causes the vitrifiable feed material 14 to quickly mix, react, and become chemically integrated into the glass melt 16. However, the agitation and stirring of the glass melt 16 by the discharge of the combustion products 68 from the submerged burner(s) 62 also promotes bubble formation within the glass melt 16. Consequently, the glass melt 16 is foamy in nature and includes a homogeneous distribution of entrained gas bubbles. The entrained gas bubbles may account for 30 vol % to 60 vol % of the glass melt 16, which renders the density of the glass melt 16 relatively low, typically ranging from 0.75 $gm/cm^3$ to 1.5 $gm/cm^3$, or more narrowly from 0.99 $gm/cm^3$ to 1.3 $gm/cm^3$, for soda-lime-silica glass. The gaseous inclusions entrained within the glass melt 16 vary in size and may contain any of several gases including $CO_2$, $H_2O$ (vapor), $N_2$, $SO_2$, $CH_4$, CO, and volatile organic compounds (VOCs).

The vitrifiable feed material 14 introduced into the interior reaction chamber 34 has a composition that is formulated to provide the glass melt 16, particularly at the molten glass outlet 48, with a predetermined glass chemical composition upon melting. For example, the glass chemical composition of the glass melt 16 may be a soda-lime-silica glass chemical composition, in which case the vitrifiable feed material 14 may be a physical mixture of virgin raw materials and optionally cullet (i.e., recycled glass) and/or glass precursors that provides a source of $SiO_2$, $Na_2O$, and CaO in the correct proportions along with any of the other materials listed below in Table 1 including, most commonly, $Al_2O_3$. The exact constituent materials that constitute the vitrifiable feed material 14 are subject to much variation while still being able to achieve the soda-lime-silica glass chemical composition as is generally well known in the glass manufacturing industry.

TABLE 1

Glass Chemical Composition of Soda-Lime-Silica Glass

| Component | Weight % | Raw Material Sources |
|---|---|---|
| $SiO_2$ | 60-80 | Quartz sand |
| $Na_2O$ | 8-18 | Soda ash |
| CaO | 5-15 | Limestone |
| $Al_2O_3$ | 0-2 | Nepheline Syenite, Feldspar |
| MgO | 0-5 | Magnesite |
| $K_2O$ | 0-3 | Potash |
| $Fe_2O_3$ + FeO | 0-0.08 | Iron is a contaminant |
| $MnO_2$ | 0-0.3 | Manganese Dioxide |
| $SO_3$ | 0-0.5 | Salt Cake, Slag |
| Se | 0-0.0005 | Selenium |
| F | 0-0.5 | Fluorines are a contaminant |

For example, to achieve a soda-lime-silica glass chemical composition in the glass melt 16, the feed material 14 may include primary virgin raw materials such as quartz sand (crystalline $SiO_2$), soda ash ($Na_2CO_3$), and limestone ($CaCO_3$) in the quantities needed to provide the requisite proportions of $SiO_2$, $Na_2O$, and CaO, respectively. Other virgin raw materials may also be included in the vitrifiable feed material 14 to contribute one or more of $SiO_2$, $Na_2O$, CaO and possibly other oxide and/or non-oxide materials in the glass melt 16 depending on the desired chemistry of the soda-lime-silica glass chemical composition and the color of the glass articles being formed therefrom. These other virgin raw materials may include feldspar, dolomite, and calumite slag. The vitrifiable feed material 14 may even include up to 80 wt % cullet depending on a variety of factors. Additionally, the vitrifiable feed material 14 may include secondary or minor virgin raw materials that provide the soda-lime-silica glass chemical composition with colorants, decolorants, and/or redox agents that may be needed, and may further provide a source of chemical fining agents to assist with downstream bubble removal.

Referring still to FIG. 1, the unrefined foamy molten glass 18 discharged from the SC melter 10 through the molten glass outlet 48 is drawn from the glass melt 16 and is chemically homogenized to the desired glass chemical composition, e.g., a soda-lime-silica glass chemical composition, but with the same relatively low density and entrained volume of gas bubbles as the glass melt 16. The unrefined foamy molten glass 18 flows directly through the flow path 124 of the throat 20 and into the stilling chamber 82 of the stilling tank 70 where it merges with the intermediate pool of molten glass 84. Molten glass from the intermediate pool of molten glass 84, in turn, flows along the flow direction F and into the spout chamber 112 of the feeding spout 72 to supply the transfer pool of molten glass 114. Due to the settling of the intermediate pool of molten glass 84 and, optionally, the impingement of the pool with combustion products, including those of the high-velocity roof burner 90b, the transfer pool of molten glass 114 may have a higher density than the glass melt 16 contained in the SC melter 10, which can help reduce downstream glass fining efforts. The molten glass feed 22 delivered from the feeding spout 72 is drawn from the transfer pool of molten glass 114 and delivered through the orifice plate 100 at a controlled rate as governed by the controlled reciprocating movement of the reciprocal plunger 104.

The molten glass feed 22 may be further processed into a glass article including, for example, a flat glass or container glass article, among other options. To that end, the molten glass feed 22 delivered from the feeding spout 72 may have a soda-lime-silica glass chemical composition as dictated by the formulation of the vitrifiable feed material 14. The downstream component 24 to which the molten glass feed 22 is supplied may be a glass finer 132 that includes a housing 134 defining a fining chamber 136. A molten glass bath 138 is held within the fining chamber 136 and flows from an inlet opening 140 defined in one end of the housing 134 to an outlet opening 142 defined in an opposite end of the housing 134. A plurality of non-submerged burners 144 are mounted in the housing 134 of the glass finer 132 above the molten glass bath 138 and combust a mixture of fuel and oxidant. The combustion products emitted from the burners 144 transfer heat to the molten glass bath 138 to help promote the ascension and bursting of entrained gas bubbles and dissolved gases. In operation, the molten glass feed 22 is received into the fining chamber 136 through the inlet opening 140 and combines with the molten glass bath 138 contained in the fining chamber 136. The molten glass bath 138 in turn supplies refined molten glass 146 from the outlet opening 142 of the housing 134.

Figure 9:
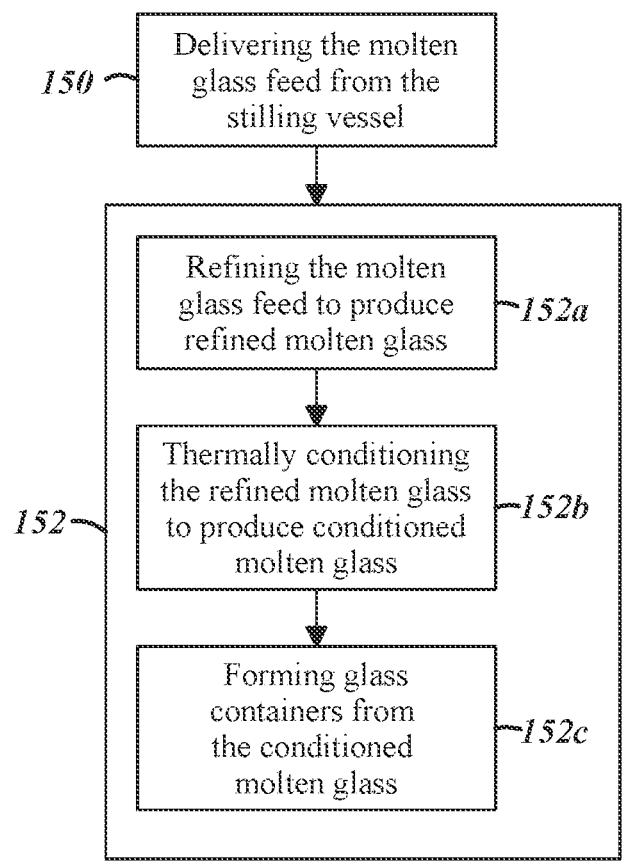
FIG. 9 is a schematic flow diagram of a process for forming glass containers from molten glass produced in a submerged combustion melter and delivered through a stilling vessel attached to the submerged combustion melter according to one embodiment of the present disclosure.

A preferred process for forming glass containers from the molten glass feed 22 drawn from the stilling vessel 12 is set forth in FIG. 9. In that process, the molten glass feed 22 is delivered from the stilling vessel 12 in step 150 as explained above. That is, the vitrifiable feed material 14 is introduced into the interior reaction chamber 34 of the SC melter 10 and consumed by the agitated glass melt 16. The vitrifiable feed material 14 melts and assimilates into the glass melt 16 as each of the submerged burner(s) 62 discharges combustion products 68 into and through the glass melt 16. The unrefined foamy molten glass 18 is discharged from the SC melter 10 and flows through the throat 20 and into the stilling chamber 82 of the stilling tank 70. There, the unrefined foamy molten glass 18 combines with the intermediate pool of molten glass 84 which, in turn, feeds the transfer pool of molten glass 114. The molten glass feed 22 is drawn from the transfer pool of molten glass 114 through the feeding spout 72. Next, in step 152, the molten glass feed 22 is formed into at least one, and preferably a plurality of, glass containers. The forming step 152 includes a refining step 152a, a thermal conditioning step 152b, and a forming step 152c. These various sub-steps 152a, 152b, 152c of the forming step 152 can be carried out by any suitable practice including the use of conventional equipment and techniques.

The refining step 152a involves removing entrained gas bubbles from the molten glass feed 22 so that the glass containers formed therefrom do not contain more than a commercially-acceptable amount of visual glass imperfections. To carry out such refining, the molten glass feed 22 is poured through the inlet opening 140 of the finer tank 132 and into the molten glass bath 138 contained within the fining chamber 136 of a finer tank 132. The molten glass 138 bath flows away from the inlet opening 140 of the glass finer 132 and towards the outlet opening 142 and is heated along that path by the non-submerged burners 144—the burners being flat flame overhead burners, sidewall pencil burners, overhead impingement burners, some combination thereof, etc. to decrease or maintain the viscosity of the molten glass bath 138 by increasing or at least maintaining the temperature of the molten glass bath 138 which, in turn, promotes the ascension and bursting of entrained gas bubbles. In many cases, the molten glass bath 138 in the fining chamber 136 is heated to a temperature between 1200° C. to 1500° C. Additionally, any chemical fining agents included in the vitrifiable feed material 14 may further facilitate bubble removal from the molten glass bath 138 by decomposing into gases, such as $SO_2$ and $O_2$, that readily ascend through the molten glass bath 138 while collecting smaller entrained gas bubbles along the way. As a result of the refining process, the molten glass bath 138 is denser and has fewer entrained gas bubbles at the end of the housing 134 where the outlet opening 142 is defined compared to the end of the housing 134 where the inlet opening 140 is defined. In particular, the refined molten glass 146 that emerges from the outlet opening 142 of the glass finer 132 typically has a density that ranges from 2.3 gm/cm$^3$ to 2.5 gm/cm$^3$ for soda-lime-silica glass.

The refined molten glass 146 attained in the glass finer 132 is thermally conditioned in the thermal conditioning step 156b. This involves cooling the refined molten glass 146 at a controlled rate to achieve a glass viscosity suitable for glass forming operations while also achieving a more uniform temperature profile within the refined molten glass 146. The refined molten glass 146 is preferably cooled to a temperature between approximately 1000° C. and 1200° C. to provide conditioned molten glass. The thermal conditioning of the refined molten glass 146 may be performed in a separate forehearth that receives the refined molten glass 146 from the outlet opening 142 of the glass finer 132. A forehearth is an elongated structure that defines an extended channel along which overhead and/or sidewall mounted burners can consistently and smoothly reduce the temperature of the flowing refined molten glass. In another embodiment, however, the fining and thermal conditioning steps 156a, 156b may be performed in a single structure, such as a combined glass finer and forehearth structure, that can accommodate both fining of the molten glass feed 22 and thermal conditioning of the refined molten glass 146.

Glass containers are then formed from the conditioned molten glass in the forming step 156c. In some standard container-forming processes, the conditioned molten glass is discharged from a glass feeder at the end of the finer/forehearth as molten glass streams or runners. The molten glass runners are then sheared into individual gobs of a predetermined weight. Each gob is delivered via a gob delivery system into a blank mold of a glass container forming machine. In other glass container forming processes, however, molten glass is streamed directly into the blank mold to fill the mold with glass. Once in the blank mold, and with its temperature still between approximately 1000° C. and 1200° C., the molten glass gob is pressed or blown into a parison or preform that includes a tubular wall. The parison is then transferred by from the blank mold into a blow mold of the glass container forming machine for final shaping into a container. Once the parison is received in the blow mold, the blow mold is closed and the parison is rapidly outwardly blown into the final container shape that matches the contour of the mold cavity using a compressed gas such as compressed air. Other approaches may of course be implemented to form the glass containers besides the press-and-blow and blow-and-blow forming techniques including, for instance, compression or other molding techniques.

The glass container formed within the blow mold has an axially closed base and a circumferential wall. The circumferential wall extends from the axially closed base to a mouth that defines an opening to a containment spaced defined by the axially closed base and the circumferential wall. The glass container is allowed to cool while in contact with the mold walls of the blow mold and is then removed from the blow mold and placed on a conveyor or other transport device. The glass container is then reheated and cooled at a controlled rate in an annealing lehr to relax thermally-induced strain and remove internal stress points. The annealing of the glass container involves heating the glass container to a temperature above the annealing point of the soda-lime-silica glass chemical composition, which usually lies within the range of 510° C. to 550° C., followed by slowly cooling the container at a rate of 1° C./min to 10° C./min to a temperature below the strain point of the soda-lime-silica glass chemical composition, which typically lies within the range of 470° C. to 500° C. The glass container may be cooled rapidly after it has been cooled to a temperature below the strain point. Any of a variety of coatings may be applied to the surface of the glass container either before (hot-end coatings) or after (cold-end coatings) annealing for a variety of reasons.

There thus has been disclosed a method of producing glass using submerged combustion melting technology that satisfies one or more of the objects and aims previously set forth. The molten glass may be further processed into glass articles including, for example, glass containers. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A system for producing glass, the system comprising: a stilling vessel that includes a stilling tank and a feeding spout, the stilling tank having a housing formed of a refractory material that is not fluidly cooled and that includes a floor, a roof, a front end wall, and a rear end wall and that defines a stilling chamber, an inlet in the front end wall, an outlet in the rear end wall, and one or more non-submerged burners aimed to discharge combustion products into the stilling chamber, and the feeding spout being appended to the stilling tank so as to cover the outlet of the stilling tank, the feeding spout having a spout bowl having an inlet that fluidly communicates with the outlet of the housing of the stilling tank, and an orifice plate defining at least one orifice for delivering a molten glass feed out of the feeding spout, wherein the stilling vessel is configured to receive unrefined molten glass through the inlet at a fluctuating flow rate and the feeding spout is configured to deliver the molten glass feed out of the feed spout at a controlled flow rate.

2. The system set forth in claim 1, wherein the one or more non-submerged burners includes a plurality of non-submerged burners mounted in an upstanding wall of the housing of the stilling tank.

3. The system set forth in claim 2, wherein at least one of the plurality of non-submerged burners mounted in the upstanding wall is pivotably mounted.

4. The system set forth in claim 1, wherein the one or more non-submerged burners includes a plurality of roof burners mounted in a roof of the housing of the stilling tank.

5. The system set forth in claim 4, wherein the plurality of roof burners are mounted in the roof of the housing and are spaced apart across the roof from one side wall of the housing to an opposed side wall of the housing.

6. The system set forth in claim 4, wherein at least one of the plurality of non-submerged burners mounted in the roof is pivotably mounted.

7. The system set forth in claim 1, wherein the feed spout also has at least one reciprocal plunger aligned with the at least one orifice of the orifice plate and that is movable with respect to the at least one orifice to deliver the molten glass feed at the controlled flow rate.

8. The system set forth in claim 1, wherein the stilling chamber is configured to hold an intermediate pool of molten glass and, and the feed spout also includes one or more cover blocks, wherein the spout bowl, the orifice plate, and the one or more cover blocks define a spout chamber to hold a transfer pool of molten glass.

9. A system for producing glass, the system comprising:
a stilling vessel that includes a stilling tank and a feeding spout, the stilling tank having a housing formed of a refractory material that is not fluidly cooled and that defines a stilling chamber, an inlet, an outlet, and one or more non-submerged burners aimed to discharge combustion products into the stilling chamber, and the feeding spout being appended to the stilling tank so as to cover the outlet of the stilling tank, the feeding spout having a spout bowl, an orifice plate defining at least one orifice, and at least one reciprocal plunger aligned with the at least one orifice of the orifice plate and that is movable with respect to the at least one orifice, wherein the stilling vessel is configured to receive unrefined molten glass through the inlet at a fluctuating flow rate and the feeding spout is configured to deliver a molten glass feed through the at least one orifice of the orifice plate at a controlled flow rate.

\* \* \* \* \*